(12) United States Patent
Smith

(10) Patent No.: US 6,563,662 B2
(45) Date of Patent: May 13, 2003

(54) INTEGRATED OPTICAL TRACKING SYSTEM FOR MAGNETIC MEDIA

(75) Inventor: Archibald W. Smith, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/880,285

(22) Filed: Jun. 12, 2001

(65) Prior Publication Data

US 2001/0043426 A1 Nov. 22, 2001

Related U.S. Application Data

(63) Continuation of application No. 09/203,784, filed on Dec. 2, 1998, now Pat. No. 6,275,349.

(51) Int. Cl.$^7$ ............................................... G11B 5/596
(52) U.S. Cl. .................................................. 360/77.03
(58) Field of Search .................... 360/77.03; 369/14, 369/43

(56) References Cited

U.S. PATENT DOCUMENTS

| | | | |
|---|---|---|---|
| 3,426,337 A | 2/1969 | Black et al. | |
| 4,057,833 A | 11/1977 | Braat | |
| 4,510,544 A | 4/1985 | Lazzari | |
| 4,558,383 A | 12/1985 | Johnson | |
| 4,615,944 A * | 10/1986 | Gardner | 360/131 X |
| 4,633,450 A | 12/1986 | Gueugnon | |
| 4,633,451 A * | 12/1986 | Ahn et al. | 369/14 |
| 4,779,250 A | 10/1988 | Kogure et al. | |
| 4,843,494 A * | 6/1989 | Cronin et al. | 360/77.03 |
| 4,864,552 A | 9/1989 | Getreuer et al. | |
| 4,958,245 A | 9/1990 | Roth et al. | |
| 4,987,505 A * | 1/1991 | Iwabuchi et al. | 360/103 |
| 4,996,677 A | 2/1991 | Naito et al. | |
| 5,325,244 A * | 6/1994 | Takano et al. | 360/77.03 |
| 5,493,553 A | 2/1996 | Maurice et al. | |
| 5,563,868 A | 10/1996 | Farnsworth et al. | |
| 5,796,710 A | 8/1998 | Maurice et al. | |

FOREIGN PATENT DOCUMENTS

| | | |
|---|---|---|
| EP | 0 344 759 A2 | 12/1989 |
| EP | 0 877 372 A2 | 11/1998 |
| WO | WO 99/28909 | 6/1999 |

* cited by examiner

*Primary Examiner*—David Hudspeth
*Assistant Examiner*—K. Wong
(74) *Attorney, Agent, or Firm*—Brooks & Kushman P.C.

(57) ABSTRACT

An improved servo system having an optical head array integrated into the magnetic head, and optical servo tracks incorporated on the magnetic side of a medium. The optical head array includes a light source array that individually illuminates the optical servo tracks through a beam splitter array and a lens array. Light beams incident on the optical servo tracks are individually reflected back through the lens array and beam splitter array to respective bi-cell photo detectors. The signals from the bi-cell photo detector are amplified by respective differential amplifiers to produce error signals indicative of the alignment of the magnetic head with the optical servo tracks. The error signals are combined by a circuit to produce a position error signal.

6 Claims, 4 Drawing Sheets

INTEGRATED OPTICAL TRACKING SYSTEM FOR MAGNETIC MEDIA

CROSS-REFERENCE TO RELATED APPLICATIONS

This application is a continuation U.S. application Ser. No. 09/203,784 filed Dec. 2, 1998 now U.S. Pat. No. 6,275,349, the entirety of which is incorporated by reference herein.

TECHNICAL FIELD

The present invention relates to the field of servo tracking systems which integrate an optical head array into a magnetic head to follow optical servo tracks disposed on the magnetic side of a medium.

BACKGROUND ART

Modern magnetic tape drives employ combination read/write heads that incorporate multiple side-by-side data heads along with one or more read heads dedicated to sensing servo tracks added to, or interleaved with the data tracks. As the density of the data tracks is increased from 500 tracks per inch to 5000 tracks per inch, the accuracy of the servo system must increase to maintain proper alignment. If the size of the servo tracks is not decreased, then valuable surface area on the tape is not available for data storage, and the head becomes more complicated due to the unequal spacing of the magnetic heads. Reducing the size of the servo tracks frees more space on the tape, but makes it more difficult for the servo system to maintain the necessary positional accuracy. Dedicated servo tracks can be eliminated all together using a complex process of encoding the track and data together when writing, and signal processing to extract a position error signal when reading. Even when this is done, differences in the format of the servo information from tape drive type to tape drive type can make a tape written on one machine unreadable on another.

Several approaches have been developed to uncouple the function of magnetic data storage from the function of servo tracking by using optics. Early approaches used optical edge sensors to follow one or both edges of the tape. Using these edges as references, the data tracks were defined at fixed distances across the tape. These approaches were subject to tracking misalignment as the edges of the tape became worn and tattered. They also did not transfer well to disk media where the inner data tracks were several inches away from the disk edge requiring precision offsets over long distances.

To eliminate the dependency of the condition of the tape edges, optical servo tracks were placed on the back side of the tape. While this improved tracking accuracy, this method is difficult to carry out in small form factors because access is required on both sides to the tape. Further more, establishing initial mechanical alignment from tape drive to tape drive, and maintaining that alignment for several years is difficult with the optical tracking components on one side of the tape and the magnetic data components on the other side. To overcome this alignment problem, optical marks have been added to the magnetic head to calibrate the optical tracking components. This however increases the size and complexity of the total system.

In mid-1970's developments in the field of optical disks produced optical tracking systems using a single narrow laser beam to read and track data recorded on the disks. An example of such a system is disclosed in U.S. Pat. No. 4,057,833 issued to Braat on Nov. 8, 1977. The system taught by Braat can follow an optical track of data only 0.5 $\mu$m wide. Modern optical disk systems can support up to 40,000 tracks per inch to accuracies of better than 0.1 $\mu$m. A couple of patents have been issued which merge the single beam servo tracking capabilities from the optical disks with magnetic disk media. U.S. Pat. No. 4,558,383 issued to Johnson on Dec. 10, 1985 discloses an information storage disk transducer position control system using prerecorded optical servo patterns. In Johnson, a magnetic head is mounted for common movement with an optical head that follows reflective patterns above or below the magnetic coating. U.S. Pat. No. 4,958,245 issued to Roth et al. on Sep. 18, 1990 discloses an apparatus and method that employ an optical servo system for use with a magnetic head and a magnetic medium. Roth et al. discloses the use of a bi-cell or a quad-cell optical detector to follow the edge of optical servo tracks cut into the magnetic side of the medium. The optical head is then mechanically attached to the magnetic head at a fixed distance to align the magnetic head with the magnetic data tracks. However, the prior art does not disclose the accuracy and reliability obtained by an array of servo track heads, combined with the fine servo track widths of the optical heads, and integrated with the magnetic heads into a single combination head for stability.

DISCLOSURE OF INVENTION

The present invention provides an improved servo tracking system that uses an optical head array integrated with multi-unit magnetic heads to follow optical servo tracks defined on the same side of the media as the magnetic layer.

Accordingly, it is an object of the present invention to provide an improved servo system. The base system is a combination head, having multiple magnetic heads to read and write data in a magnetic layer on a medium. The improvement is the integration of an optical head array into the combination head, and the incorporation of optical servo tracks on the magnetic layer side of the medium. The optical head array includes a light source array that illuminates the optical servo tracks through a beam splitter array and a lens array. Light incident on the optical servo tracks is reflected back through the lens array and beam splitter array to a bi-cell photo detector array. The bi-cell photo detector signals are amplified by a differential amplifier array to produce error signals that are indicative of the alignment of the head with the optical tracks. The error signals are combined by a circuit to produce a position error signal.

BRIEF DESCRIPTION OF DRAWINGS

FIG. 8 is a drawing of one bi-cell photo detector with a graph of the optical servo track image intensity versus position aligned above the drawing, and a graph of the error signal versus position aligned above that;

BEST MODE FOR CARRYING OUT THE INVENTION

Figure 1:
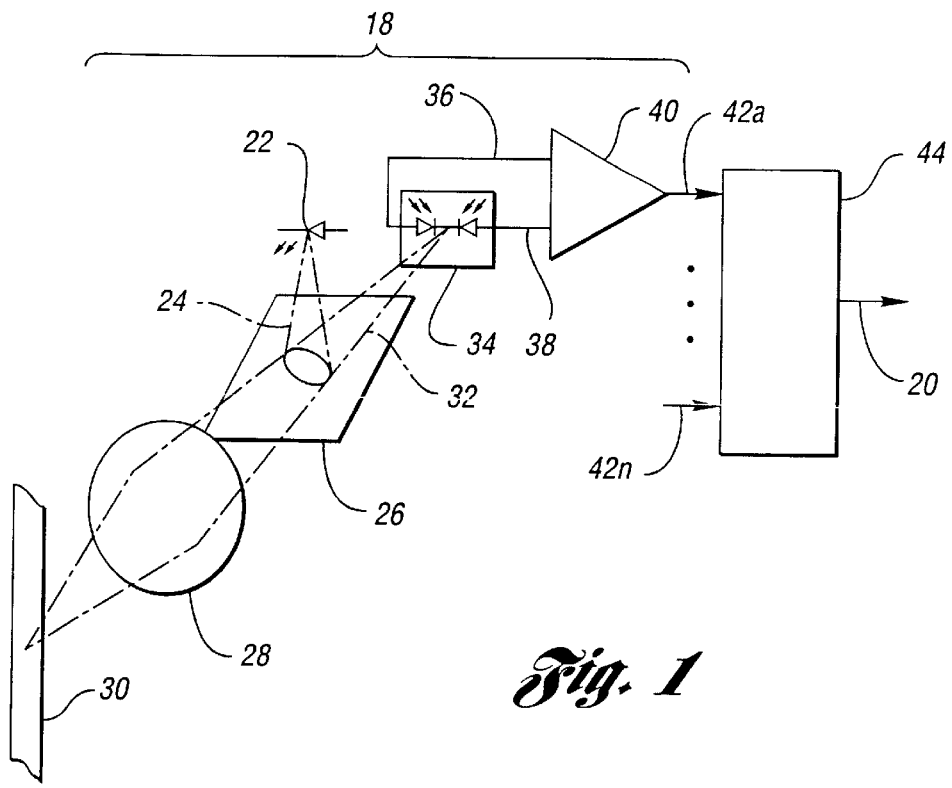
FIG. 1 is a block diagram of one optical head and an optical servo track according to the invention.

FIG. 1 shows one set of the optics and electronics that comprise an optical head 18 according to the present invention. Each optical head 18 has a light source 22 that emits an incident light beam 24. The incident light beam 24 is deflected by a beam splitter 26 through a lens 28 and onto an optical servo track 30 provided on the magnetic medium. The optical servo track 30 reflects the light beam 24 back through the lens 28 toward the beam splitter 26. Beam splitter 26 allows some of the reflected light beam 32 to pass straight through to where it impinges on a bi-cell photo detector 34. Each cell of the bi-cell photo detector 34 produces a photo current on electrical leads 36 and 38 proportional to the amount of the reflected light beam 32 received by that cell. A differential amplifier 40 outputs an error signal on lead 42a proportional to the difference between the photo currents on electrical leads 36 and 38. The optical head 18 described above is repeated multiple times to produce an array of error signals on leads 42a–42n. Circuit 44 processes these error signals on leads 42a–42n to produce a position error signal on lead 20 for use by a servo mechanism.

Figure 2:
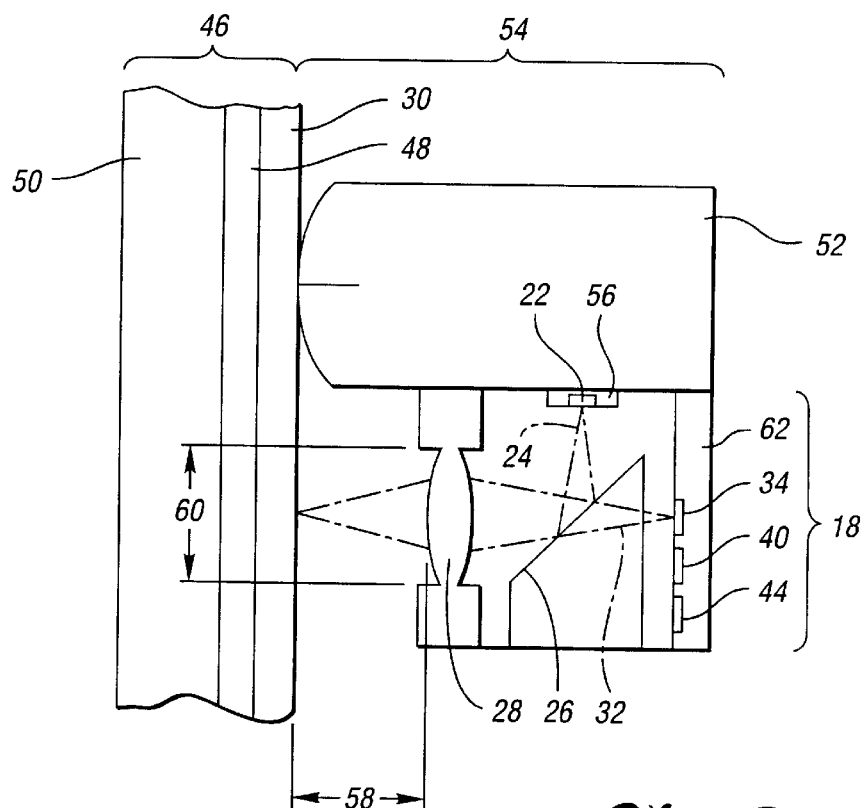
FIG. 2 is a fragmentary cut away view of a medium, and a combination head showing a magnetic head and one optical head.

FIG. 2 shows the physical form of a medium 46 and an optical head 18. The optical servo track 30 is disposed on the magnetic layer 48 on the same side of the substrate 50. Alternatively, the optical servo track 30 is placed between the magnetic layer 48 and substrate 50. All of the optical head 18 optics and electronics are bonded to a multi-unit magnetic head 52 to form a stable integrated combination head 54. In the preferred embodiment, the light source 22 is an array of infrared light emitting diodes (LED), operating at a wavelength of approximately 0.8 μm. The LEDs may be fabricated on a GaAs substrate 56. In practice, the light source 22 can be any other light emitting device, coherent or non coherent, solid state, or the like which can be fabricated small enough to be integrated with a magnetic head, and of sufficient low power to avoid thermal problems. Other operating wavelength can be selected based upon the accuracy requirements, the choice of optical material for beam splitter 26 and lens 28, and the choice of the bi-cell photo detector 34 material.

The parameters of lens 28 are selected based upon the optical resolution required to achieve the desired positioning accuracy. The optical resolution is determined by the numerical aperture of the lens 28, which is approximately the ratio of the radius of the lens to the focal length. A numerical aperture of approximately 0.5 has a resolution of about one wavelength—which is 0.8 μm for the infrared light emitted by the light source 22. This numerical aperture, and an approximately one millimeter spacing between the lens 26 and the medium 46, illustrated as distance 58, requires a lens diameter of approximately one millimeter, illustrated as distance 60.

The reflected light beam 32 reaching the bi-cell photo detector 34 is of low power. Therefore, it is desirable that the bi-cell photo detector 34 and the differential amplifier 40 be physically placed as close together as possible to avoid picking up stray noise. This is achieved in the preferred embodiment by fabricating the bi-cell photo detector 34 as positive-intrinsic-negative silicon photo diodes in the same silicon substrate 62 as the differential amplifier 40.

Finally, the preferred embodiment of the beam splitter 26 is a half-silvered or dielectric coated mirror that deflects the incident light beam 24 at a right angle. Other embodiments for the beam splitter will be discussed later.

Figure 3:
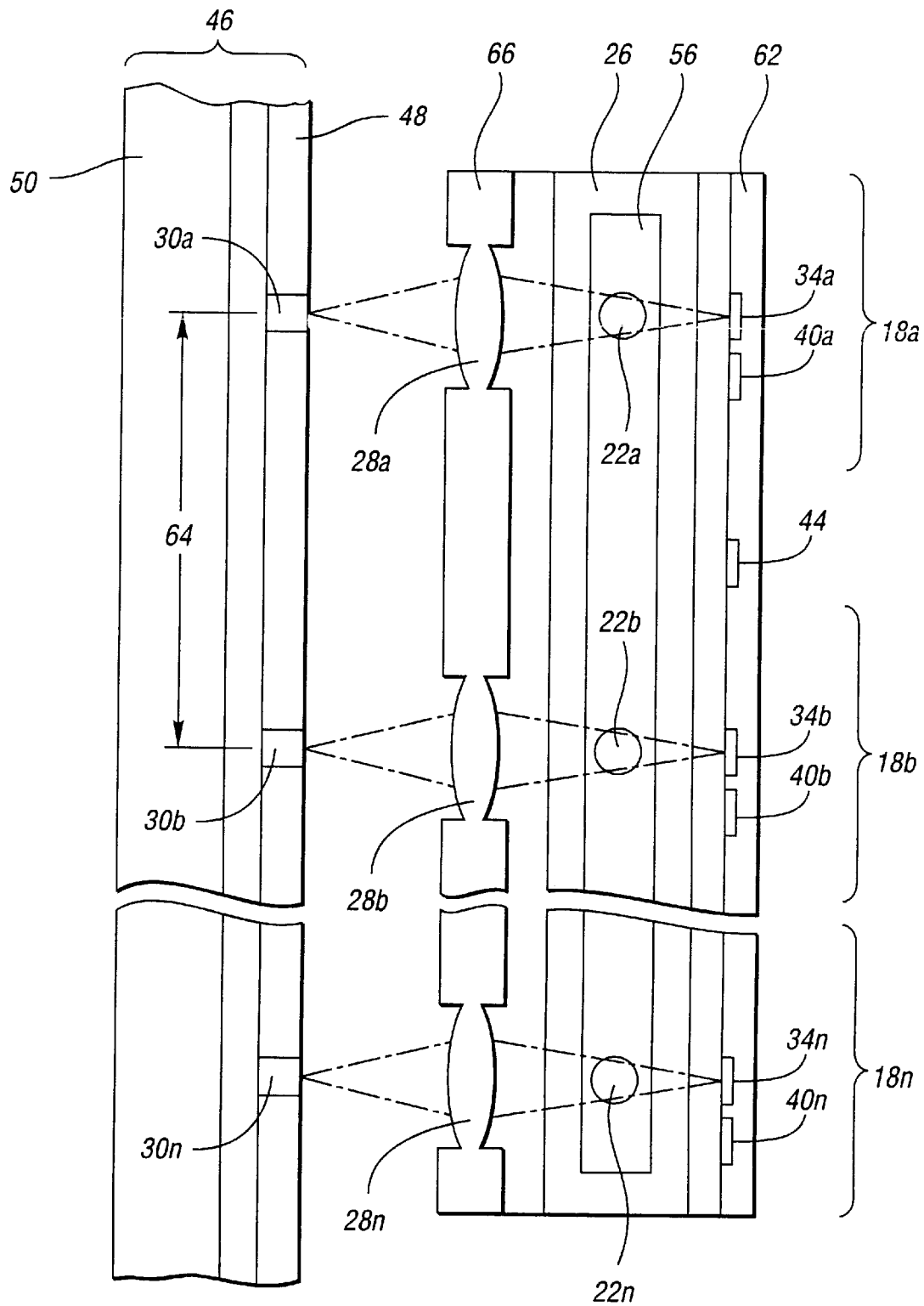
FIG. 3 is a fragmentary cut away view of a medium and an array of optical heads.

FIG. 3 shows a fragmented view containing several optical heads 18a–18n. The number of optical heads 18a–18n and their center-to-center spacing 64 can be tailored to meet the needs of various applications. Increasing the number of optical heads 18a–18n increases the position accuracy and reliability of the servo tracking system. Reducing the center-to-center spacing 64 between optical heads 18a–18n decreases the size of the combination head 54. In the preferred embodiment, the center-to-center spacing 64 between optical heads 18a–18n is approximately two millimeters. To achieve this level of integration in the combination head 54, the arrays of components are fabricated as monolithic units. Lenses 28a–28n are fabricated using injection molding to create a single lens array unit 66. Likewise, the beam splitter 26 is fabricated by injection molding as a single piece. LED light sources 22a–22n are fabricated on a common GaAs substrate 56. The bi-cell photo detectors 34a–34n and differential amplifiers 40a–40n are fabricated on a common silicon substrate 62. To further the integration, the circuit 44 can also be fabricated on the silicon substrate 62.

Figure 4:
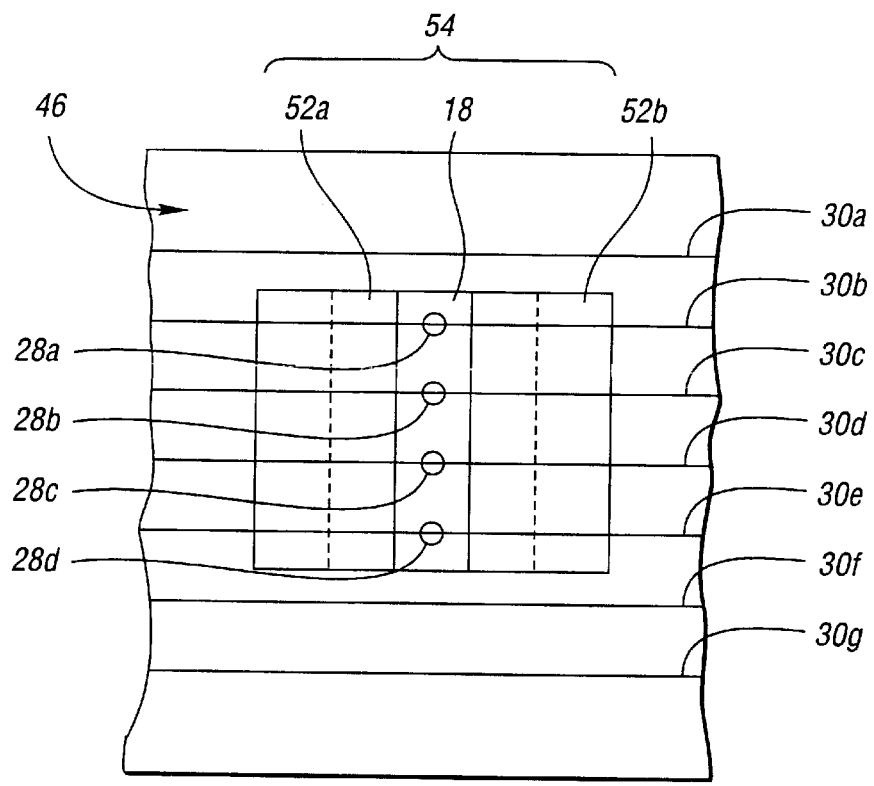
FIG. 4 is an elevated view, as seen looking through a tape medium, at a combination head with a multi-unit read magnetic head, a multi-unit write magnetic heads, and four optical heads.

FIG. 4 shows the preferred embodiment of the system as seen looking at the combination head 54 through a tape medium 46. In this embodiment, the combination head 54 comprises a multi-unit read magnetic head 52a, and a multi-unit write magnetic head 52b, with the multiple optical heads 18 sandwiched there between. The medium 46 is a magnetic tape with a plurality of optical servo tracks 30a–30g. As shown in the figure, the number of optical servo tracks 30a–30g exceeds the number of lenses 28a–28d. In this situation, the combination head 54 is stepped between optical servo track 30a–30g to reach the entire width of the tape medium 46. For other applications, the number of optical heads 18 matches the number of optical servo tracks 30 and the combination head 54 covers the entire width of the medium 46.

Figure 5:
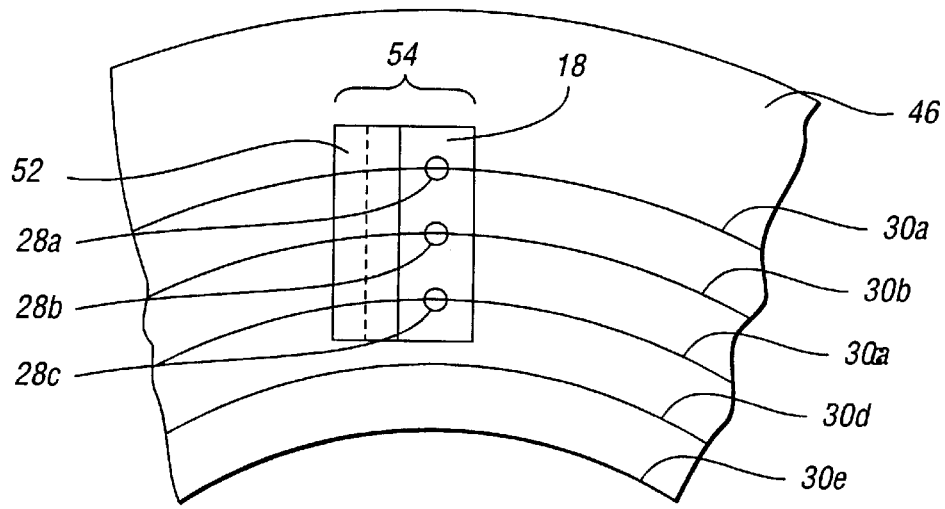
FIG. 5 is an elevated view, as seen looking through a disk medium, at a combination he ad with multiple magnetic heads and three optical heads.

FIG. 5 is an example of a different configuration of combination head 54 and a different type of medium 46. Here, the combination head 54 comprises one multi-unit magnetic head 52 bonded to the optical heads 18. The medium 46 is a magnetic disk with a plurality of concentric optical servo track 30a–30e.

Figure 6:
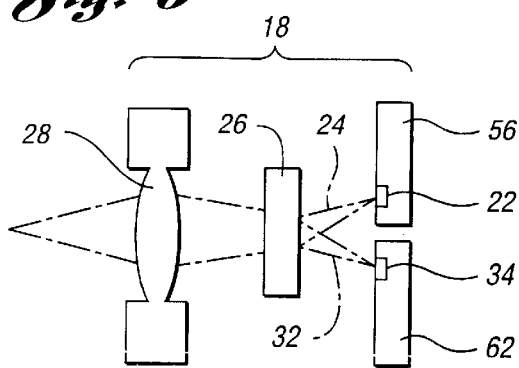
FIG. 6 is a fragmentary cut away of an alternate embodiment of FIG. 2 using holographic elements, one substrate for the light source array, and another substrate for the sensor array.

FIG. 6 is an alternative embodiment of the present invention. The half-silver or dielectric coated mirror of the beam splitter 26 is replaced by a holographic element or a binary optical element These types of beam splitters 26 allow the light source 22 and bi-cell photo detector 34 to be coplanar. Mounting the GaAs substrate 56 and the silicon substrate 62 side-by-side makes for easier assembly of the optical head 18 since the incident light beam 24 and reflected light beam 32 are focused in the same plane.

Figure 7:
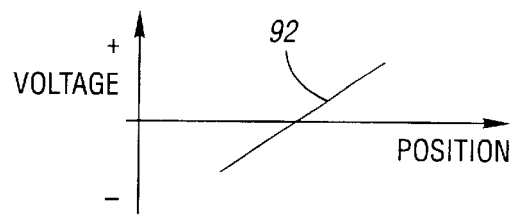
FIG. 7 is a fragmentary cut away of an alternate embodiment of FIG. 2 using binary optics and a single substrate for the light source array and the sensor array.
Figure 7:
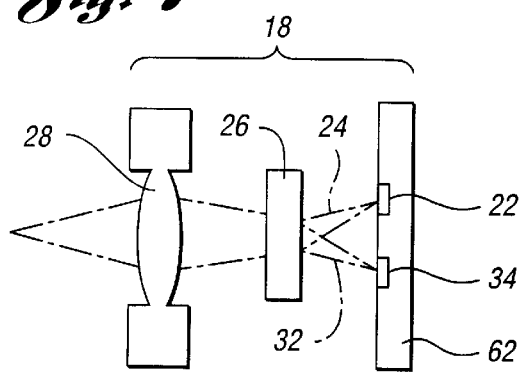

FIG. 7 is another alternative embodiment. Using a layer of poly silicon to form the light source 22, the light source 22 and bi-cell photo detector 34 can be fabricated on the same silicon substrate 62. As disclosed in the U.S. Pat. No.

4,570,191 issued to Di Stefano et al. on Feb. 11, 1986, other semiconductor materials such as GaAs, GaAlAs, and other III–V and II–VI compounds can be used to form the light source 22 and bi-cell photo detector 34 on a common substrate.

Figure 8:
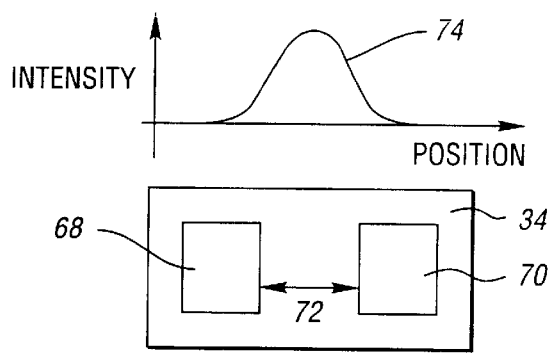

FIG. 8 is a top view of a bi-cell photo detector 34 with a graph of the intensity of the optical servo track image 74 produced by the focused reflected light beam 32, and the subsequent error signal 92 imposed above. The bi-cell photo detector 34 consists of a first cell 68 and a second cell 70 separated by a gap 72. The gap 72 is oriented transverse to the optical servo track 30. When the optical servo track image 74 is centered on the gap 72 a zero volt error signal 92 is produced. When the optical servo track image 74 is displaced from the center of the gap 72, the amplitude of the error signal 92 is proportional to displacement, while the polarity is determined by the direction of displacement.

Figure 9:
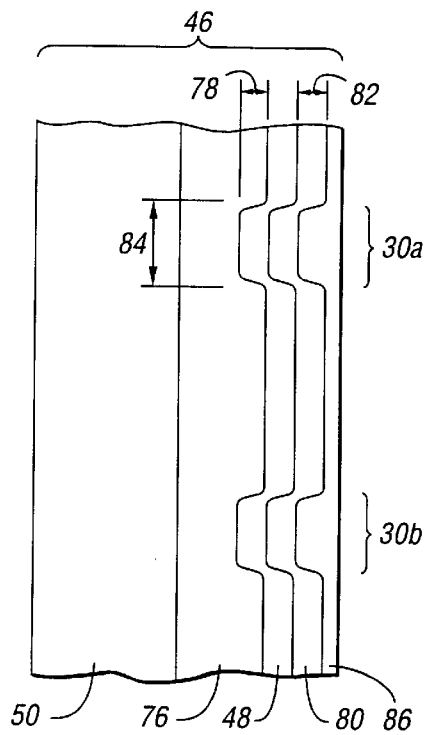
FIG. 9 is a fragmentary profile drawing of a medium in which embossed depressions define the optical servo tracks.

FIG. 9 is one embodiment of the medium 46 showing two of the optical servo tracks 30a–30b. A polymer layer 76 between the substrate 50 and magnetic layer 48 is embossed with the pattern for the optical servo tracks 30a–30b. Embossing may be accomplished with a formatting roller or like process. The embossed depth, illustrated as depth 78, should be approximately ⅛th of the wavelength of the light emitted by light source 22. For a GaAs LED which emits light at a wavelength of 0.8 $\mu$m, the embossed depth is 80 nm. Such a shallow embossed depth is benign to the recording process. Alternatively, the magnetic recording can be restricted to the space between the embossed tracks. Because the magnetic layer 48 has a low reflectivity, a reflective layer 80 is applied over the entire surface of the magnetic layer 48. An example of a reflective layer 80 is an aluminum layer with a thickness of about 30 nm, illustrated as distance 82. This aluminum layer is sufficiently thin to be benign to the recording process. The width of the optical servo tracks 30a–30b, indicated as distance 84, is typically 2 $\mu$m to 7 $\mu$m but can take other values to optimize the position error signal. Finally, a layer of lubricant 86 may be applied over the reflective layer 80.

Figure 10:
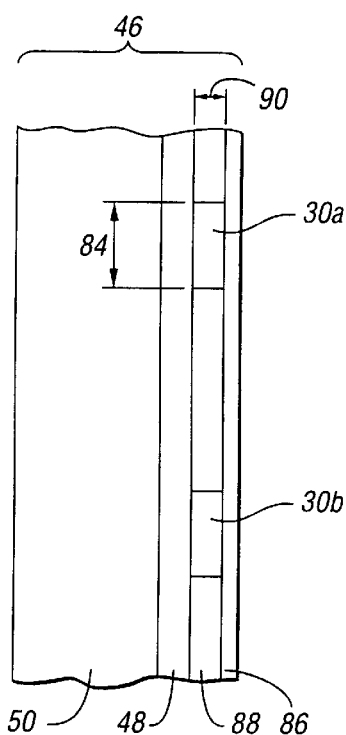
FIG. 10 is a fragmentary profile drawing of a medium using a layer of amorphous to crystalline phase change material to define the optical servo tracks.

FIG. 10 is another embodiment of the medium 46. Here the magnetic layer 48 is flat against the substrate 50. An amorphous to crystalline phase change layer 88 at a thickness of 30 nm, indicated as distance 90, covers the magnetic layer 48. The amorphous to crystalline phase change layer is sufficiently thin so as not to disrupt the recording process. The optical servo tracks 30a–30b are reflective crystallized lines in the amorphous to crystalline phase change layer 88 with a typical width of 2 $\mu$m to 7 $\mu$m, indicated by distance 84. A lubricant 86 or other protective layer covers the amorphous to crystalline phase change layer 88. In the case of a magnetic layer 48 which is optically transparent at the wavelength of the light emitted by the light source 22, for example the near infrared, the amorphous to crystalline phase change layer 88 may alternatively be disposed between the magnetic layer 48 and substrate 50. The writing of the optical servo tracks 30a–30b, and the subsequent reading is performed at the wavelength at which the magnetic layer 48 is transparent.

While the preferred embodiment of the invention has been shown and described it will be understood by those skilled in the art that many possible variations can be made without departing from the scope of this invention. This invention is not to be limited by the specific embodiments, and it is defined in the following claims.

What is claimed is:

1. A servo tracking system for positioning a magnetic head assembly having a plurality of magnetic heads comprising:

a light source array attached to the magnetic head assembly, the light source array emitting an array of light beams incident on magnetic media accessed by the magnetic head assembly;

a bi-cell photo detector array attached to the magnetic head assembly, the bi-cell photo detector array having a bi-cell photo detector corresponding to each incident light beam, each photo detector converting the corresponding light beam reflected from the magnetic media into a photo current; and an electrical circuit in communication with each bi-cell photo detector, the electrical circuit generating a position error signal based on each photo current.

2. A servo tracking system for positioning a magnetic head assembly as in claim 1 wherein each light beam reflects from an optical servo track comprising a plurality of crystalline lines formed in a layer of amorphous to crystalline phase change material disposed on the magnetic media.

3. A system for generating a position error signal for a magnetic head assembly relative to magnetic media, the magnetic head assembly having a plurality of magnetic heads, the system comprising:

a plurality of light sources attached to the head assembly, each light source trained at one of a plurality of servo tracks written on the magnetic media;

a plurality of photo detectors attached to the head assembly, each photo detector converting light reflected from one of the servo tracks into a photo current, the photo current indicative of position error with respect to the servo track reflecting light into the photo detector; and an electrical circuit in communication with each photo detector, the electrical circuit generating an error signal based on each photo current, the electrical circuit further generating the head assembly position error signal by combining each error signal.

4. A system for generating a position error signal for a magnetic head assembly as in claim 3 wherein each servo track comprises a plurality of crystalline lines formed in a layer of amorphous to crystalline phase change material disposed on the magnetic media.

5. A method for generating a position error signal for a magnetic head assembly relative to magnetic media, the magnetic head assembly having a plurality of magnetic heads, the method comprising:

directing a plurality of light beams at the magnetic media, each light beam directed at a corresponding servo track on the magnetic media;

receiving each light beam reflected from the corresponding servo track;

determining an error signal for each received light beam; and combining the error signal for each received light beam to generate the position error signal.

6. A method of tracking a magnetic head assembly having a plurality of magnetic heads, the method comprising:

emitting an array of light beams at magnetic media accessed by the magnetic head assembly;

reflecting each beam in the array of beams from a servo track written on the magnetic media;

converting each reflected light beam into a photo current; and generating a position error signal based on each photo current.

* * * * *